US009473483B2

(12) United States Patent
Choudhary et al.

(10) Patent No.: US 9,473,483 B2
(45) Date of Patent: *Oct. 18, 2016

(54) FACILITATED INFORMATION EXCHANGE TO A SERVICE PROVIDER FOR A REQUESTED SERVICE

(71) Applicant: International Business Machines Corporation, Armonk, NY (US)

(72) Inventors: Manish Choudhary, Bangalore (IN); Srinivasan S. Muthuswamy, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/712,193

(22) Filed: May 14, 2015

(65) Prior Publication Data

US 2016/0055557 A1 Feb. 25, 2016

Related U.S. Application Data

(63) Continuation of application No. 14/462,670, filed on Aug. 19, 2014.

(51) Int. Cl.
*G06F 7/08* (2006.01)
*H04L 29/06* (2006.01)
*G06F 17/30* (2006.01)
*G06Q 30/06* (2012.01)

(52) U.S. Cl.
CPC ......... *H04L 63/08* (2013.01); *G06F 17/30289* (2013.01); *G06Q 30/0609* (2013.01); *H04L 63/105* (2013.01); *H04L 67/42* (2013.01)

(58) Field of Classification Search
CPC .......... G06F 7/08; G06F 17/00; G06K 19/00
USPC .................. 235/381, 375, 487; 705/28–29
See application file for complete search history.

(56) References Cited

U.S. PATENT DOCUMENTS 6,438,690 B1    8/2002   Patel et al.
7,587,366 B2    9/2009   Grim, III et al.
(Continued)

FOREIGN PATENT DOCUMENTS

WO       2012122123 A1    9/2012

OTHER PUBLICATIONS

IBM Appendix P, list of IBM patents or patent applications treated as related, pp. 1-2.
(Continued)

*Primary Examiner* — Edwyn Labaze
(74) *Attorney, Agent, or Firm* — Daniel R. Simek; Maeve M. Carpenter (57) ABSTRACT

A method, a computer program product and a computer system, for exchanging information to provide services, is provided. A computer processor creates an information repository associated with a service requestor, in response to receiving a request for service from the service requestor. The computer processor notifies a service provider of the request for service from the service requestor. The computer processor receives a request for information from the service provider, regarding information about the service requestor. The computer processor forwards the request for information to one or more information providers. The computer processor stores information in the information repository, in response to receiving the information from the one or more information providers, and notifies the service provider to retrieve the information from the information repository.

9 Claims, 5 Drawing Sheets

(56) References Cited

U.S. PATENT DOCUMENTS

| | | | |
|---|---|---|---|
| 7,676,439 B2 | 3/2010 | Tattan et al. | |
| 8,484,699 B2 | 7/2013 | Nadalin et al. | |
| 2002/0194131 A1* | 12/2002 | Dick | G06F 19/322 705/51 |
| 2005/0010780 A1 | 1/2005 | Kane et al. | |
| 2005/0021354 A1* | 1/2005 | Brendle | G06F 9/465 717/100 |
| 2005/0021557 A1 | 1/2005 | Brendle et al. | |
| 2005/0091276 A1* | 4/2005 | Brunswig | G06F 17/30979 |
| 2006/0080426 A1 | 4/2006 | Brunswig et al. | |
| 2008/0294536 A1* | 11/2008 | Taylor | G06Q 10/08 705/28 |
| 2009/0080408 A1 | 3/2009 | Natoli et al. | |
| 2009/0205036 A1* | 8/2009 | Slaton | H04L 63/083 726/9 |
| 2010/0057586 A1* | 3/2010 | Chow | G01S 19/14 705/26.1 |
| 2010/0125511 A1 | 5/2010 | Jouret et al. | |
| 2014/0172479 A1* | 6/2014 | Gallagher | G06Q 10/063114 705/7.15 |
| 2014/0282980 A1* | 9/2014 | Kolluru | H04L 63/08 726/7 |
| 2014/0337528 A1 | 11/2014 | Barton et al. | |

OTHER PUBLICATIONS

Cavoukian, Ann, Ph.D., "Privacy by Design and the Emerging Personal Data Ecosystem", Information and Privacy Commissioner, Ontario, Canada, Oct. 2012, pp. 1-39, <www.privacybydesign.ca>.

Lahteenmaki et al., "Document-based service architecture for communication between health and wellness service providers and customers", Second International Conference on Pervasive Computing Technologies for Healthcare, Jan. 30-Feb. 1, 2008, pp. 275-278.

"Dropbox", accessed May 13, 2014 3:29 PM, pp. 1-4, <https://www.dropbox.com/>.

"Google Drive", accessed May 13, 2014 12:08 PM, 1 page, <http://docs.google.com/>.

"HealthVault", accessed May 13, 2014 3:36 PM, © 2014 Microsoft, pp. 1-2, <https://www.healthvault.com>.

"Facilitated Information Exchange to a Service Provider for a Requested Service", U.S. Appl. No. 14/462,670, filed Aug. 19, 2014, pp. 1-41.

U.S. Appl. No. 14/944,606, Entitled "Facilitated Information Exchange to a Service Provider for a Requested Service", filed Nov. 18, 2015.

Appendix P.: List of IBM Patents or Patent Applications Treated as Related, Dated Nov. 18, 2015, 2 pages.

* cited by examiner

FACILITATED INFORMATION EXCHANGE TO A SERVICE PROVIDER FOR A REQUESTED SERVICE

BACKGROUND OF THE INVENTION

The present invention relates generally to the field of information authentication, and more particularly to providing information to a service provider regarding a user requesting a service.

There are numerous services available to current day consumers, across a wide range of areas, such as financial, health-related, insurance, government organization, utilities, employers, and background checks, to name a few. Easy and convenient access to services is a highly desirable condition for most consumers as service requestors, but service providers typically require particular information regarding the service requestor, before services are delivered. Among other reasons, the need for the information may be to qualify the service requestor, confirm the service requestor's ability to pay for services rendered, clarify the most appropriate type of service, or establish authentication of the service requestor.

The information required by service providers includes documents that may verify identity, employer, income, address, as well as many other aspects of a service requestor's personal and/or private information. Availability to upload digital copies of information and digital documents to a service provider's web site or portal may greatly improve the delivery of information corresponding to service requestors, to service providers. However, the service requestor bears the burden to locate or create digital copies of documents and information, and perform the delivery actions to the service providers. The benefits of improved delivery of digitized information and documents are weighed against an increase in exposure to loss of privacy and security of personal information, and the challenge of service requestors to perform multiple manual actions to locate, obtain, transmit, and authenticate, information and physical copies of documents to provide the information required by service providers. Service requestors may store the physical copies of private and/or personal information for future service provider requirements, creating additional exposure.

SUMMARY

According to one embodiment of the present invention, a method for exchanging information to provide services, is provided. A computer processor creates an information repository associated with a service requestor, in response to receiving a request for service from the service requestor. The computer processor notifies a service provider of the request for service from the service requestor. The computer processor receives a request for information from the service provider, regarding information about the service requestor. The computer processor forwards the request for information to one or more information providers. The computer processor stores information in the information repository, in response to receiving the information from the one or more information providers, and notifies the service provider to retrieve the information from the information repository.

DETAILED DESCRIPTION

Many aspects of commerce and service are moving in a direction of using paperless documentation, and providers of commerce and service enable and allow customers to use online systems to initiate activities to order, apply, register, purchase, confirm, or resolve issues. Embodiments of the present invention recognize that the conveniences of using online systems to enable services include challenges. Often, a consumer wishing to receive services from a service provider bears the responsibility to locate, request, obtain, and transfer documents that include information required by the service provider, in order to receive or qualify for the service. The consumer, or service requestor, manually searches and requests the individual information documents, provides personal information to confirm authentication, and having obtained the information documents, the service requestor uploads the digital copies to the service provider web site. The individual pieces of information requested by the service provider may not be available from a single source, and may result in time-consuming efforts by the service requestor to locate and obtain the information documents. Each service provider may use a different format and may require a different mode of access for inputting information and documents on their respective websites. Service requestors have to deal with these transactional differences and may need to interact with disparate systems that vary between different service providers.

Some embodiments of the present invention provide an information exchange between information providers and service providers, based on a request from a service requestor. Some embodiments include an information exchange that connects a service requestor to information providers and service providers. Some embodiments manage the secure and authorized exchange of data regarding the service requestor, from the information providers to a service provider. The information exchange includes techniques in which sources of information from information providers, are identified, authenticated, and included in a verified information source listing. The information exchange also includes a listing of service providers and specific information each service provider requires to provide the service. Service requestors, which are users or consumers of services, access the information exchange, are authenticated, and are enabled to select services from the listing of service providers. In one embodiment of the present invention, service providers, information providers, and service requestors, are each registered with the information exchange, establishing the identities of the participating parties, establishing authentication, and including additional security measures as required by the services offered and the required information. A service requestor that is registered with the information exchange, selects a service from service providers registered with the information exchange. Responsive to the selection of a service from a service provider, requests for information regarding the service requestor are sent to information providers that are registered with the information exchange. Information providers retrieve the requested information regarding the service requestor, and provide the requested information to the information exchange. The information exchange forwards the requested information to the service providers. Responsive to the review of the requested information, and the requested information meeting standards of the service provider, the service provider provides the service to the service requestor.

Figure 1:
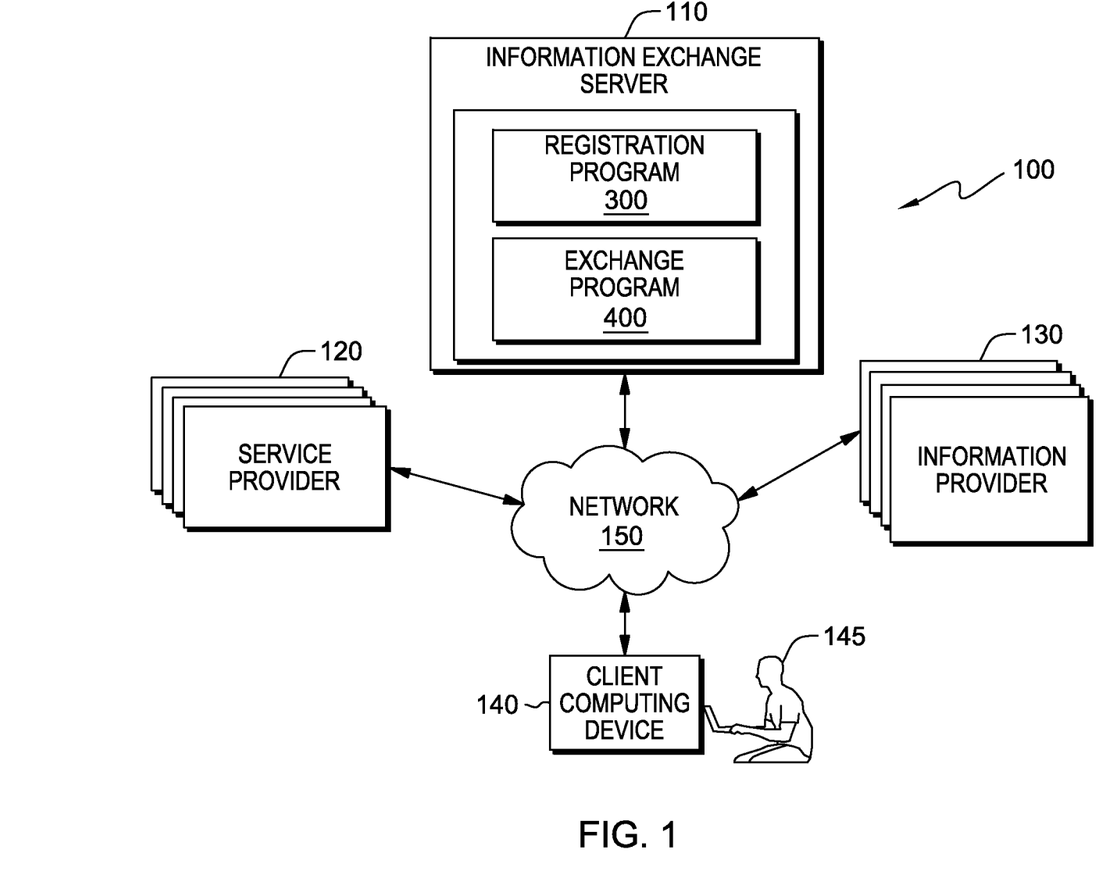
FIG. 1 is a functional block diagram of a distributed information exchange environment, in accordance with an embodiment of the present invention.

The present invention will now be described in detail with reference to the Figures. FIG. 1 is a functional block diagram of a distributed information exchange environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed information exchange environment 100 includes, information exchange server 110, service provider 120, information provider 130, client computing device 140, used by service requestor 145, all interconnected via network 150. Network 150 can be, for example, a local area network (LAN), a telecommunications network, a wide area network (WAN), such as the Internet, a virtual local area network (VLAN), or any combination that can include wired, wireless, or fiber optic connections. In general, network 150 can be any combination of connections and protocols that will support communications between information exchange server 110, service provider computing device 120, information provider computing device 130, and client computing device 140, in accordance with some embodiments of the present invention.

Service requestor 145 is a user accessing distributed information exchange environment 100 by using client computing device 140. Service requestor 145 is authenticated to information exchange server 110, and authorizes information provider 130 to access information regarding service requestor 145 for the purpose of receiving approval for services requested from service provider 120. Service requestor 145 may authenticate by one or more methods providing an appropriate level of security. For example, service requestor 145 may authenticate by one or more password, a challenge question, a smart card, a touch screen pattern, a public/private key infrastructure (PKI) certificate, or by use of a secure socket layer (SSL) connection. Service requestor 145 authorizes information provider 130 to obtain information requested by service provider 120, for the services requested.

Client computing device 140 is a computing device used by service requestor 145 to select a service and initiate the collection and delivery of the information necessary for the service provider to determine if the service is to be provided. In some embodiments of the present invention, the service provider may qualify service requestor 145 to determine if certain items of eligibility are met in order to provide the requested service, for example, a financial loan, a membership, or an insurance policy.

Client computing device 140 may be a server, a mobile computing device, a laptop computer, a tablet computer, a netbook computer, a personal computer (PC), a desktop computer, a smart phone, or any programmable electronic device or computing system capable of receiving and sending data, and performing computer readable program instructions capable of communicating with information exchange server 110, via network 150. In other embodiments, client computing device 140 can be virtual instances operating on a computing system utilizing clustered computers and components (e.g., database server computer, application server computers, etc.) that act as a single pool of seamless resources when accessed within distributed computer processing environment 100. Client computing device 140 may include internal and external hardware components, as depicted and discussed further in regard to FIG. 5.

Information provider 130 is a computing device that receives requests for information regarding a requested service. Information provider 130 receives information requests from information exchange server 110, which directs the requests for information received from service provider 120 in response to a request for service. Information provider 130 includes authenticated sources of information corresponding to service requestor 145, and may be stored in storage devices connected to information provider 130, or may be accessible to information provider 130, via network 150. Information provider 130 obtains information corresponding to the requests by service provider 120, which is used to determine if service requestor 145 adequately meets qualifications to receive the requested service. For example, information provider 130 may obtain information verifying employment, income, time at current address, and credit rating, for service requestor 145, in response to receiving requests for information. The requests for information are forwarded from information exchange server 110, in response to receiving requests for information from service provider 120. Service provider 120 generates the requests for information in response to receiving a request for service which is initiated by service requestor 145 using client computing device 140, such as a service request for a financial loan.

Information provider 130 may be a server computer, a mobile computing device, a laptop computer, a tablet computer, a netbook computer, a personal computer (PC), a desktop computer, or any programmable electronic device or computing system capable of receiving and sending data, and performing computer readable program instructions capable of communicating with information exchange server 110, via network 150. In other embodiments, information provider 130 can be virtual instances operating on a computing system utilizing clustered computers and components (e.g., database server computer, application server computers, etc.) that act as a single pool of seamless resources when accessed within distributed computer processing environment 100. Information provider 130 may include internal and external hardware components, as depicted and discussed further in regard to FIG. 5.

In one embodiment of the present invention, information provider 130 is a plurality of computing devices having access to authenticated information sources providing information that corresponds respectively to individual requests of a service provider. Each service provider may submit requests for information that requires a different set of information providers. A non-limiting list of example information sources of information provider 130 may include, a source of employment verification, a source verifying income, a source of current debt, a source of citizenship, a source of driver's license information and history, a source of educational records, a source of membership status, and/or a source of criminal record or background check. In another embodiment of the present invention, information provider 130 is a computing device including access to a repository of information based on the registered service providers and the information requested by each provider, and based on the registered service requestors, such as service requestor 145.

Service provider 120 is a computing device that receives requests for services from information exchange server 110, as a result of an authenticated service requestor 145 requesting a service. Service provider 120 responds to requests for service by generating requests for information to be used by service provider 120 to determine the type of service, the extent of service, and determine if the service requestor, such as service requestor 145, qualifies to receive the service. The qualification may be basic, such as determining if the service requestor can pay for the service, or may be more extensive, such as qualifying for a mortgage loan, or submitting an employment application. A service provider may have a particular set of information requests associated with a particular service.

Subsequent to the retrieval of the requested information, service provider 120 is granted access to information and determines if the service requestor qualifies to receive the service. In some embodiments of the present invention, service provider 120 determines if the service requestor qualifies for the service without intervention, by comparison of the information to qualification values, ranges, or predetermined levels. In other embodiments, some or all of the information is reviewed and decisions of delivering the service are made by users of service provider 120.

Service provider 120 may be a server computer, a mobile computing device, a laptop computer, a tablet computer, a netbook computer, a personal computer (PC), a desktop computer, or any programmable electronic device or computing system capable of receiving and sending data, and performing computer readable program instructions capable of communicating with information exchange server 110, via network 150. In other embodiments, service provider 120 can be virtual instances operating on a computing system utilizing clustered computers and components (e.g., database server computer, application server computers, etc.) that act as a single pool of seamless resources when accessed within distributed computer processing environment 100. Service provider 120 may include internal and external hardware components, as depicted and discussed further in regard to FIG. 5.

Information exchange server 110 is a computing device that performs exchange transactions of requests and information, among registered entities of distributed information exchange environment 100. Information exchange server 110 receives requests for service from service requestor 145, using client computing device 140. Information exchange server 110 also receives requests for information from service provider 120, and sends the requests for information to the appropriate information provider 130. Information provider 130 may be identified based on the personal information contained in the profile and registration of the service requestor. Subsequently, information exchange server 110 receives the requested information from information provider 130 and notifies service provider 120 of the availability of the requested information. In some embodiments of the present invention, information exchange server 110 may generate and maintain one or more information vaults for a service requestor, such as service requestor 145. An information vault is a virtual information repository, created by exchange program 400 operating on information exchange server 110, and stored in memory devices accessible to information exchange server 110. Each information vault corresponds to a particular service request that a service requestor, such as service requestor 145, submits to information exchange 110.

Information exchange server 110 operates registration program 300 and exchange program 400. Registration program 300 receives registration requests from service requestors, service providers, and information providers, and registers the requestors upon successful validation of authentication credentials. In some embodiments of the present invention, service providers, information providers, and service requestors may have multiple roles, for example, a service provider may also register as an information provider, such as a bank. An information provider, such as a department of motor vehicles, may be a service provider when registering a newly obtained vehicle.

Information exchange server 110 also operates exchange program 400, which receives service requests, creates information vaults, requests and receives information from information providers, and notifies the service provider and grants access to the information vault when the requested information is available. In one embodiment of the present invention, exchange program 400 maintains information vaults by controlling access and by clearing contents of the vault after services have been received.

Information exchange server 110 may be a management server, a web server, a mobile computing device, or any other electronic device or computing system capable of receiving and sending data. In other embodiments, information exchange server 110 may represent a computing system utilizing multiple computers as a server system, such as in a cloud computing environment. In yet another embodiment, information exchange server 110 may be a laptop computer, a tablet computer, a netbook computer, a personal computer (PC), a desktop computer, a personal digital assistant (PDA), a smart phone, or any programmable electronic device capable of communicating with service provider 120, information provider 130, and client computing device 140, via network 150. In another embodiment, information exchange server 110 can be a computing system utilizing clustered computers and components (e.g., database server computer, application server computers, etc.) that act as a single pool of seamless resources when accessed within distributed information exchange environment 100. Information exchange server 110 may include internal and external hardware components, as depicted and described with reference to FIG. 5.

Figure 2:
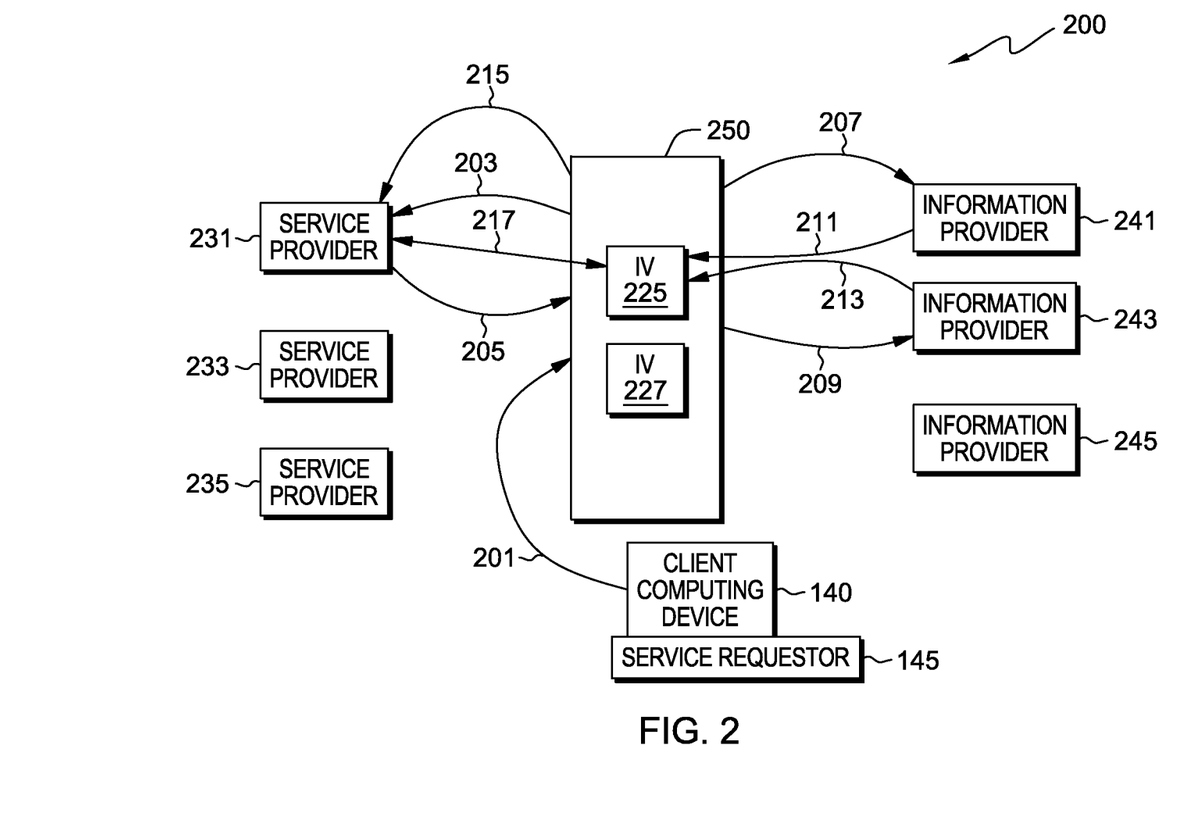
FIG. 2 depicts a flow diagram depicting transaction sequence 200 between elements of the distributed information exchange environment of FIG. 1, in accordance with an embodiment of the present invention.

FIG. 2 is a flow diagram depicting transaction sequence 200 between elements of distributed information exchange environment 100, in accordance with an embodiment of the present invention. FIG. 2 includes service providers 231, 233, and 235, information providers 241, 243, and 245, information exchange 250, client computing device 140 used by service requestor 145. Information exchange 250 is depicted as including information vault (IV) 225 and IV 227. In one embodiment of the present invention, information exchange 250 is a virtual repository for information vaults, such as IV 225 and IV 227, and is enabled by registration program 300 (discussed in detail with regard to FIG. 3), to register service requestors, service providers and information providers. Information exchange 250, enabled by registration program 300, verifies the authenticity of the registering entities. Additionally, information exchange 250 provides the secure conduit of requests for service, requests for information, provision of information, and access to the provided information.

For example, in one embodiment, registration program 300, responsive to receiving requests for registration from service requestor 145, service provider 231, and information providers 241 and 243, establishes a range or memory storage in information exchange server 110, designated as information exchange 250. Registration program 300 registers service requestor 145, service provider 231, and information providers 241 and 243, and includes the registration information within the memory storage designated for information exchange 250. Responding to receiving a request for service via transaction 201 from service requestor 145, exchange program 400 generates IV 225 as designated memory within information exchange 250, and designates IV 225 to be assigned to service requestor 145. Service requestor 145 selects a service from service provider 231, and exchange program 400 associates IV 225 with service provider 231. Exchange program 400 associates IV 225 with information providers 241 and 243, in response to determining the information requested can be provided by information providers 241 and 243.

For brevity and example purposes, the discussion of FIG. 2 will include the transactions and information exchange between service provider 231, information exchange 250, information vault 225 and information providers 241 and 243. Service providers 233 and 235 are registered with information exchange 250, having been authenticated and verified, and are computing devices associated with service offerings that, in another embodiment of the present invention, may be requested by service requestor 145. Information provider 245 is registered with information exchange 250, and is a computing device with access to particular information in regards to service requestor 145, which, in another embodiment, may be requested in connection with another requested service. It should be noted that in one embodiment, the transactions discussed with respect to FIG. 2 assume the completion of operational steps of registration program 300, and are performed or received by exchange program 400 operating on information exchange server 110, as is discussed in regards to FIG. 3 and FIG. 4, respectively. For simplicity in discussion of the transactions depicted in FIG. 2, operational steps performed by exchange program 400 are reference as transactions of information exchange 250.

In one embodiment, service requestor 145 uses client computing device 140 to submit a request for service, and an information vault for the requested service, with information exchange server 110, in transaction 201. As part of the service request transaction, service requestor 145 requests a service from a listing of one or more service providers registered with information exchange 250, for example, selecting service provider 231. In response to receiving the request for service, information vault (IV) 225 is created within information exchange 250. IV 225 is a virtual vault and has an assigned association with service requestor 145 and the service requested from service provider 231. A notification of the request for service is sent from information exchange 250 to service provider 231, via transaction 203.

Service provider 231 responds by sending requests for information in connection with the requested service, to information exchange 250, in transaction 205. The requests include the information that service provider 231 uses to provide the requested service, and in some embodiments of the present invention, the requests for information are to determine if service requestor 145 qualifies for the service. Information exchange 250, receives the information requests associated with the service from service provider 231, in transaction 205.

Information exchange server 110 determines the information providers from which the requested information for service requestor 145 can be obtained. In one embodiment, the information providers are determined based on information included in the registration of the service requestor, such as information included in a profile or settings file during registration. Information exchange 250 receives requests for information from service provider 231, regarding service requestor 145, and (by operational steps of exchange program 400), determines the requests for information are to be directed to information provider 241 and information provider 243. In one embodiment of the present invention, the determination of directing the requests for information, are based on registration data of the information providers, and registration and profile information of service requestor 145. Transaction 207 sends information requests to information provider 241, and transaction 209 includes information requests sent to information provider 243. Transactions 207 and 209 include information identifying service requestor 145 as the subject to which the information requests apply.

Information providers 241 and 243 obtain their respective requested information and send the information to information exchange 250 in transactions 211 and 213, respectively. Information exchange 250 receives the information from information providers 241 and 243, and stores the information in IV 225. For example, the information requested includes identification of a current employer, current income, and outstanding debt on current loans. Information exchange 250 determines that for service requestor 145, information provider 241 can obtain the verification of employment and current income information, and determines that information provider 243 can obtain outstanding debt on current loans for service requestor 145. Information exchange 250 receives the information from information providers 241 and 243, and stores the information in IV 225.

Transaction 215 includes authorization, by information exchange 250, for service provider 231 to access IV 225 and retrieve the information responses from information providers 241 and 243, which are associated with the service requested by service requestor 145. Service provider 231 accesses IV 225 and retrieves the information, in transaction 217. In some embodiments of the present invention, the information retrieved by service provider 231, from IV 225, is evaluated manually by users as decision makers. In other embodiments, the information is evaluated by comparing predetermined criteria and ranges to the retrieved information, and generating a decision of providing the service based on a favorable comparison. For example, the information from information providers 241 and 243 is stored in IV 225. Transaction 215 includes sending a notification to service provider 231 that authorizes service provider 231 to access IV 225 and retrieve the requested information. Service provider 231 accesses IV 225, in transaction 217, and retrieves the requested information. Service provider 231 uses the retrieved information to determine whether to deliver the service to service requestor 145.

In another embodiment, service requestor 145 manually selects the service from registered service providers, and is able to view the information the service provider requests to deliver the service. Service requestor 145 selects, for example from a listing, the information provider(s) that includes or can access the information requested by the service provider. The information is sent from information providers and is stored in IV 225, and service provider 231 is notified and authorized to access the information in IV 225.

Figure 3:
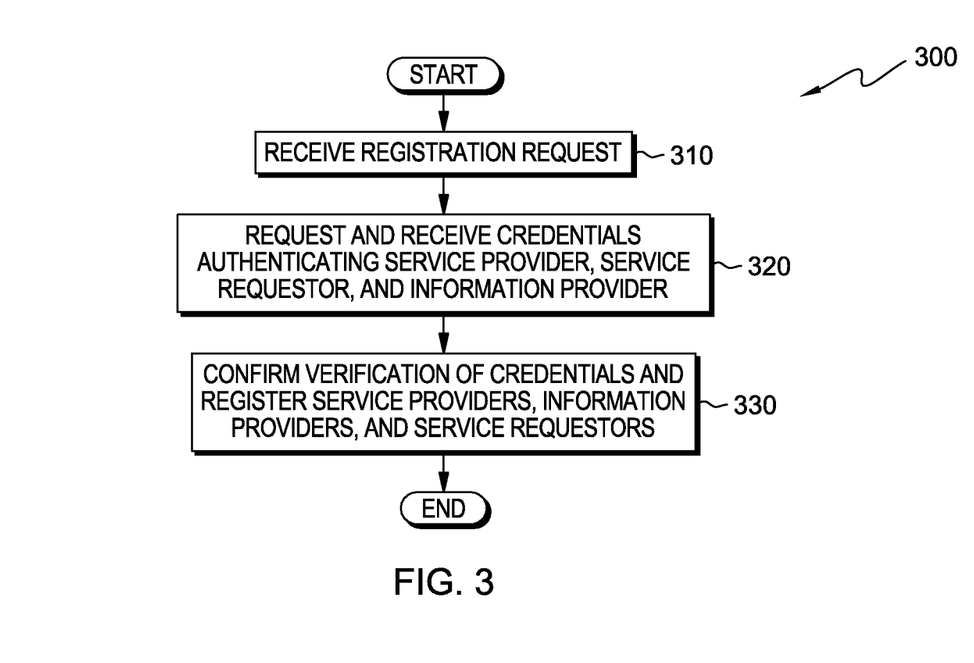
FIG. 3 is a flowchart depicting the operational steps of a registration program for the distributed information exchange environment, in accordance with an embodiment of the present invention.

FIG. 3 is a flowchart depicting the operational steps of registration program 300, operating within distributed information exchange environment 100, in accordance with an embodiment of the present invention. In an embodiment of the present invention, registration program 300, operating on information exchange server 110, receives a registration request (step 310). Distributed information exchange environment 100 includes entities that interact by requesting or providing information that facilitates the authorization and delivery of services. To participate in environment 100, service providers, information providers, and service requestors, send requests to be registered within distributed information exchange environment 100. Registration program 300 receives the requests for registration. In some embodiments of the present invention, an entity may register as participating in multiple roles, as one or a combination of: a service provider, an information provider, a service requestor.

For example, a bank may request registration as a service provider of financial account services, loans, and investment advising, for example, service provider 231 (FIG. 2). The bank may also register as an information provider of account balances and loan balances for their clients, for example, information provider 245. A user may register as a service requestor and in some cases may also register as an information provider, for example, providing work history for an employment application.

Registration program 300 requests and receives credentials authenticating the service providers, service requestors, and information providers (step 320). Registration program 300 requests electronic documents for identification of the registering entity, and credentials to be used to authenticate the identity of the entity. Electronic documents and credentials may also be used to validate the services offered by a service provider or validate the access to information available to the information provider. Entities registering for more than one role provide electronic documents and credentials for each registered role.

For example, a bank, as a service provider, submits electronic documents serving as credentials authenticating the identity of the bank and certified services that the bank provides. Additionally, the bank may provide credentials of account types supported as an information provider. Information providers may register by providing documents serving as credentials of a definitive source of information, such as a state department of motor vehicles, or by providing credentials identifying and authenticating the information provider. Service requestors may submit identification documents, credentials, and submit profile information, to be used to authenticate with registration program 300.

Registration program 300 confirms verification of credentials and registers service providers, information providers, and service requestors (step 330). In one embodiment of the present invention, registration program 300 verifies the registration credentials by use of a third party authority, in which a trusted authority includes credentials of the registering entity to which the submitted credentials of the entity may be compared. In another embodiment, credentials may include use of public key infrastructure (PKI) certificates, or other existing techniques to securely authenticate the identity and online access of the service providers, information providers, and service requestors. If a registration request cannot be verified and authenticated with acceptable credentials, registration program 300 denies registration to the requesting party. Registration program generates information exchange 250, and includes the identity and authentication information of the registered entities with information exchange 250. Information exchange 250, enabled by operation of registration program 300 and exchange program 400, provides a secure conduit of request for service and information associated with the request for service.

In one embodiment of the present invention, service requestors may confirm the authenticity of information providers that can provide information relevant to the service requestor. The registration of information providers may include authorization requirements for providing service requestor information to be shared with service providers, such as a password, pass phrase, or other authentication token. In another embodiment, registration program 300 may indicate a status associated with a service provider, information provider, or service requestor that has requested registration. The status may indicate that verification of documents and credentials submitted in regards to identification and authentication of an entity, are pending verification, and once the verification is confirmed, the status indicates the entity has been verified, and if not confirmed, the registration is denied. Having received and processed registration requests, registration program 300 ends.

Figure 4:
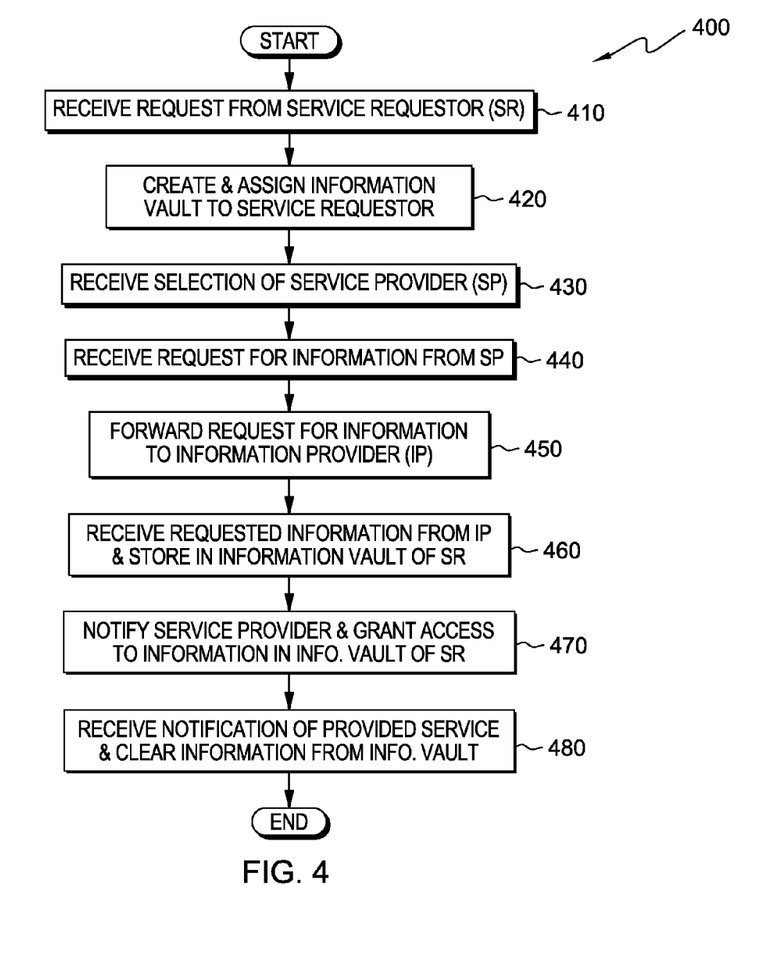
FIG. 4 is a flowchart depicting the operational steps of an exchange program, installed on and operated by a computing device of the digital information exchange environment, in accordance with an embodiment of the present invention.

FIG. 4 is a flowchart depicting the operational steps of information exchange program 400, installed on, and operated by information exchange server 110 in the distributed information exchange environment, in accordance with an embodiment of the present invention. Information exchange program 400 receives a request from a service requestor (step 410). Information exchange program 400 confirms that the service requestor is registered and verified by registration program 300, and receives a request for a service from the service requestor. By determining the registration of the service requestor, information exchange program 400 confirms the identity and authenticity of the request. In one embodiment of the present invention, the service requestor is presented with a listing of registered and verified service providers, and the services they offer. The service requestor selects the service and the service provider from the listing.

For example, information exchange program 400 receives a request for service from service requestor 145. Service requestor 145 has a status of "verified" associated with registering with registration program 300, which means service requestor 145 has submitted documents and credentials that have been verified by registration program 300, confirming the identity of service requestor 145. In one embodiment of the present invention, service requestor 145 may further authenticate by submitting a password or passphrase. In other embodiments, a trusted third party may contribute to the verification of service requestor 145.

Having received a request for a service from a service requestor, information exchange program 400 creates and assigns an information vault to the service requestor (step 420). An information vault is a virtual secured storage space that holds information about or associated with the service requestor, which is received from information providers. An information vault is specifically aligned with a particular service requested by a service requestor, as a service requestor may have multiple service requests in place at a given point in time. Information exchange program 400 securely stores the information in the information vault until such time that the need for the information with regard to the requested service no longer exists. In one embodiment of the present invention, the information is cleared from the information vault upon notification that the service provider has received and completed evaluation of the requested information. In another embodiment, the information is securely stored in the information vault for a configurable default time period, or until the service requestor sends notification that storage of the information is no longer needed. In some embodiments of the present invention, the information included within an information vault may be encrypted to further protect the information of the service requestor.

For example, in response to receiving a request for service from service requestor 145, information exchange program 400 creates information vault 225 and designates the vault to be aligned with the particular request for service from service requestor 145. If service requestor 145 makes an additional request for service, an additional information vault, such as information vault 227, will be created by information exchange program 400, and information vault 227 is unique to the additional service request. Information received from information providers, such as information providers 241 and 243, is securely stored in information vault 225 until a pre-determined default time period has expired, or a notification is received by information exchange program 400, from service provider 231, or service requestor 145, indicating the storage of the information is no longer needed.

In response to information exchange program 400 receiving the request for service, the service requestor is presented with the service providers from which a service is selected. Information exchange program 400 receives the selection of the service provider of the requested service (step 430). Service providers that are previously registered and verified by registration program 400 are made available to the service requestor and the service requestor selects a service from the available service providers. Information exchange program 400 receives the selection of the service and service provider, and associates the service requestor and the service provider with the information vault created for the current request for service by the service requestor. In response to receiving the selection of the service provider, information exchange program 400 notifies the selected service provider that an offered service has been requested.

For example, information exchange program 400 presents a listing of the registered service providers, such as service providers 231, 233, and 235 (FIG. 2), to service requestor 145, via connection of client computing device 140 to network 150. Service requestor 145 selects a service offered by a service provider, such as service provider 231. Information exchange program 400 receives the selection made by service requestor 145 and establishes a relationship of association between the selected service and service provider 231, service requestor 145, and information vault 225. The association specifically connects service requestor 145, service provider 231 and the selected service, to information vault 225, which was created in response to the request for service received from service requestor 145.

In one embodiment of the present invention, a notification is sent to the selected service provider in response to the selection by the service requestor. Having received the notification of the request for an offered service, information exchange program 400 receives a request for information from the service provider (step 440). The service provider sends a request for information regarding the service requestor, with respect to the requested service. In some embodiments of the present invention, the information requested by the service provider may be used to determine if the service requestor is able to pay for the service. In other embodiments, the information requests may be used to determine eligibility to receive the service, to qualify for membership, a job, or a volunteer position, for example.

For example, information exchange program 400 sends a notification to service provider 231 indicating that service requestor 145 has selected a service offered by service provider 231, for example, a request for a loan. Service provider 231 sends a request for information, which is received by information exchange program 400. The information request may include validation of service requestor 145's identification, place of employment, income, outstanding debt, and credit rating.

Having received a request for information from the service provider, information exchange program 400 forwards the request for information to the information providers (step 450). The requested information received from the service provider, may include requests for various types of information related to the requested service. The information request may include, for example, one or more of, additional verification of identity, financial information, employment information, background check, income information, educational records, organizational affiliations, and outstanding debt. Information exchange program 400 directs particular information requests to a particular information provider. The determination of the information provider may be based on the information requested and particular designations in a user profile associated with the service requestor.

For example, information exchange program 400 receives information requests from service provider 231 for additional identity verification of service requestor 145, employment information, income and savings information, address verification, credit rating information, and outstanding debt information. The information is requested based on qualifying service requestor 145 for a loan. Information exchange program 400 directs the additional identity verification request to an online third party trusted source, which may be, for example a database of passport data, including a photographic image of service requestor 145. Information exchange program 400 directs the financial information request to information provider 241, which in this example is a banking institution with which service requestor 145 has conducted financial transactions, according to the user profile supplied by service requestor 145 during registration with registration program 300. The savings, credit rating, and debt information are directed to information provider 241. The employment and income information request is directed, by information exchange program 400, to information provider 243, which in this example is the employer of service requestor 145. The address verification request is directed to information provider 245, which in this example is a local municipality office to which service requestor 145 pays property taxes, based on the registration profile of service requestor 145.

Information exchange program 400 receives the requested information from information providers (IP) and stores the information in the information vault of the service requestor (SR), (step 460). The information providers obtain the requested information, and respond by sending the requested information to information exchange program 400. Information exchange program 400 receives the information and stores the information in the information vault associated with the service requestor and associated with the particular service requested from the service provider. The information is securely stored in the information vault, and in one embodiment of the present invention, may be encrypted. The information stored in the information vault cannot be accessed by sources external to information exchange program 400, unless specifically authorized by information exchange program 400. The status of the receipt of information is available to the service provider, but the information cannot be edited.

For example, information providers 241, 243, and 245, respond by sending information to information exchange program 400, which stores the information in information vault 225. In one embodiment of the present invention, information exchange program 400 provides service requestor 145 with a status of the information received from information providers 241, 243, and 245, however, service requestor 145 cannot edit the information. In another embodiment of the present invention, information exchange program 400 encrypts the information received from the information providers, and prevents access by entities not authorized and verified by information exchange program 400.

Having determined that the requested information has been received, information exchange program 400 notifies the service provider and grants access to the information in the information vault of the service requestor (step 470). Information exchange program 400 determines that the information requests sent to the information providers has been received and sends a notification to the service provider along with granting the service provider access to the received information. In one embodiment of the present invention, information exchange program 400 notifies the service provider of the availability of the requested information, in response to receiving all the requested information from information providers. In another embodiment, information exchange program 400 may notify and grant access to the service provider in response to receiving at least one information request reply, and subsequently sending additional notifications as additional information request replies are received. Information exchange program 400 provides the service provider with access to the information vault in which the requested information has been stored. For cases in which all requested information has not yet been received, information exchange program 400 may send follow-up requests to the information providers, or when alternative sources of information are available, information exchange program 400 may send requests for the information to the alternative source.

For example, information exchange program 400 determines that information from information provider 241 and 243 has been received, and stores the information in information vault 225, which is associated with service provider 231, and a service selected by service requestor 145. Information exchange program 400 determines that information requests sent to information provider 245 have not been received. In one embodiment of the present invention, information exchange program sends follow-up requests to information provider 245, and notifies service provider 231 that information is available in information vault 225. Information exchange program 400 grants authority to service provider 231 to access the information stored in information vault 225. In response to receiving the additional requested information from information provider 245, information exchange program 400 notifies service provider 231 that additional information has been received and can be accessed in information vault 225.

In another embodiment, information exchange program 400 determines that information has been received from information providers 241 and 243; however, the information requested from information provider 245 has not been received. Information exchange program 400 sends additional requests to information provider 245, and notifies service provider 231 that all requested information has not yet been received from information providers. Information exchange program 400 does not provide access to the requested information in information vault 225 until all information has been received. In yet another embodiment of the present invention, the status of information received from information providers 241, 243 and 245 is made available to service requestor 145, and service requestor 145 is prompted by information exchange program 400 as to when access to available information is to be granted to service provider 231.

The service provider accesses the requested information and based on a review of the information, the service provider determines whether the service is to be provided to the service requestor. Information exchange program 400 receives notification of providing the service to the service requestor and clears information from the virtual vault (step 480). In one embodiment of the present invention, the service provider sends a notification which is received by information exchange program 400, indicating that the service requested by the service requestor, has been provided, or alternatively, the service request has been denied. The service provider may also notify the service requestor, or the notification may be passed on to the service requestor by information exchange program 400. Information exchange program 400 may indicate to the service requestor that the information vault will be cleared of information, based on the notification, within a pre-determined period of time. The pre-determined period of time may be set to allow the service requestor to interact with the service provider in situations in which follow-up clarification or discussion is required to possibly revert a denial decision. After the pre-determined period of time, the information within the information vault is deleted, and the information vault associated with the particular service requested by the service requestor is removed.

In another embodiment of the present invention, the service provider sends a notification which is received by information exchange program 400, indicating that the service requested by the service requestor, has been provided, or alternatively, the service request has been denied. The service provider may also notify the service requestor, or the notification may be passed on to the service requestor by information exchange program 400. Information exchange program 400 may prompt the service requestor to verify if the service has been provided or that the service provider does not wish to pursue the provision of the service further. The service requestor responds to the prompt from information exchange program 400, and in response to the input from the service requestor, information exchange program 400 deletes the information from the information vault and removes the information vault associated with the particular service requested by the service requestor. The information will be cleared from the information vault within a pre-determined period of time if no response is received from the prompt sent to the service requestor. In another embodiment, the service requestor may input an adjustment to the pre-determined period of time before the information within the information vault, is deleted and the information vault associated with the service requested by the service requestor is remove.

For example, information exchange program 400 receives a notification from service provider 231. The notification may be that the service requested by service requestor 145 has been provided, or it may be that the service request is denied for some reason. Information exchange program 400, after a pre-determined period of time following the notification of the service being provided to service requestor 145, clears the information from information vault 225. The notification from service provider 231 is shared with service requestor 145 by copy or a status notification from information exchange program 400. Information exchange program 400 informs the service requestor that the information vault will be cleared of information, based on the notification, within a pre-determined period of time.

Figure 5:
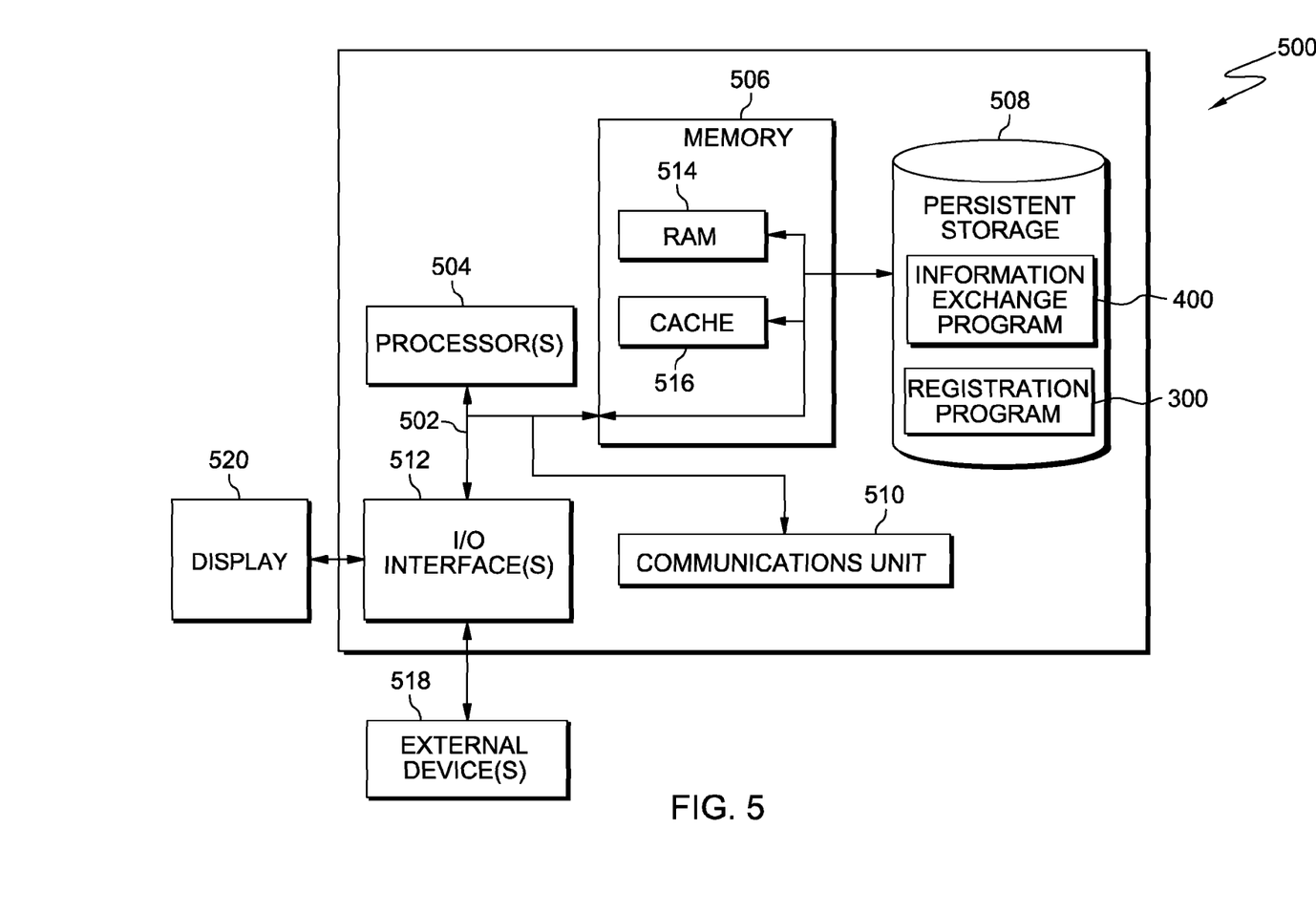
FIG. 5 is a block diagram depicting the components of computing device capable of performing the operational steps of the formation program and an information exchange program, in accordance with an embodiment of the present invention.

FIG. 5 depicts a block diagram of components of computing device 500, capable of executing registration program 300 and information exchange program 400, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

In one embodiment of the present invention, the components of computing device 500 are representative of components of information exchange server 110, and include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Registration program 300 and information exchange program 400 are stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including client computing device 140 and other resources of distributed information exchange environment 100. In these examples, communications unit 510 includes one or more network interface cards. Communications unit 510 may provide communications through the use of either or both physical and wireless communications links. Registration program 300 and information exchange program 400 may be downloaded to persistent storage 508 through communications unit 510.

I/O interface(s) 512 allows for input and output of data with other devices that may be connected to client devices 110 and 120, and conversation hosting server 140. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice some embodiments of the present invention, e.g., registration program 300 and information exchange program 400 can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for exchanging information to provide services, the method comprising: a computer processor creating an information vault for a service requestor that is previously registered, in response to receiving a first request from the service requestor for a service based on a selection made by the service requestor of a service provided by a service provider that is previously registered; the computer processor notifying the service provider that is previously registered, of the request for the service provided by the service provider selected by the service requestor; the computer processor receiving a second request from the service provider for information about the service requestor regarding a qualification of the service requestor to receive the requested service from the service provider; the computer processor forwarding to one or more information providers that are previously registered, the second request from the service provider for information regarding whether the service requestor qualifies for the service that is requested the computer processor storing in the information vault for the service requestor, the information regarding whether the service requestor qualifies for the service in response to receiving the information requested from the one or more information providers; and the computer processor notifying the service provider to retrieve the information from the information vault for the service requestor regarding whether the service requestor qualifies for the service that is requested.

2. The method of claim 1, further comprising:
responsive to receiving notification of completion of the service, the computer processor deleting the information from the information vault corresponding to the service that is requested.

3. The method of claim 1, further comprising:

the computer processor registering the service requestor, the service provider, and the one or more information providers, wherein registration includes authentication of an identity of the service provider, an identity of the service requestor, and an identity of the one or more information providers.

4. The method of claim 3, further comprising:

the computer processor creating a listing of services associated with the service provider as part of registering the service provider, from which the service requestor selects a service.

5. The method of claim 3, wherein the registration of the one or more information providers, includes confirmation by the service requestor of the one or more information providers as a source of the information for the request for information.

6. The method of claim 1, wherein the service requestor selects the service provider to provide the service.

7. The method of claim 1, wherein the one or more information providers are determined based on the request for information from the service provider that is used to determine whether the service requestor qualifies for the service that is requested.

8. The method of claim 1, wherein the information vault is a virtual information vault that is created and designated for the service requestor that selects a particular service from the service provider.

9. The method of claim 1, further comprising:

responsive to the service provider determining that the service requestor qualifies for the service, and the service provider providing the service that is requested, the computer processor receiving a notification of providing the service from the service provider, regarding the service that is requested from the service requestor.

* * * * *